United States Patent
Montanari et al.

(10) Patent No.: US 7,151,136 B2
(45) Date of Patent: Dec. 19, 2006

(54) POLYAMIDE THERMOPLASTIC COMPOSITIONS WITH IMPROVED IMPACT STRENGTH PROPERTIES

(75) Inventors: Thibaut Montanari, Bernay (FR); Philippe Bussi, Rouen (FR); Alain Bouilloux, Bernay (FR)

(73) Assignee: Arkema, Puteaux (FR)

( * ) Notice: Subject to any disclaimer, the term of this patent is extended or adjusted under 35 U.S.C. 154(b) by 155 days.

(21) Appl. No.: 10/240,560

(22) PCT Filed: Apr. 3, 2001

(86) PCT No.: PCT/FR01/00991

§ 371 (c)(1),
(2), (4) Date: Jun. 10, 2003

(87) PCT Pub. No.: WO01/74947

PCT Pub. Date: Oct. 11, 2001

(65) Prior Publication Data

US 2004/0059056 A1    Mar. 25, 2004

(30) Foreign Application Priority Data

Apr. 4, 2000 (FR) .................................. 00 04268

(51) Int. Cl.
*C08L 77/00* (2006.01)
*C08L 77/02* (2006.01)
*C08L 77/06* (2006.01)
(52) U.S. Cl. .................. 525/66; 525/178; 525/179
(58) Field of Classification Search .................. 525/66, 525/178, 179
See application file for complete search history.

(56) References Cited

U.S. PATENT DOCUMENTS

| 4,945,129 A | 7/1990 | Mason et al. |
| 5,508,345 A | 4/1996 | Hirata et al. |
| 2006/0009581 A1* | 1/2006 | Araki et al. ................ 525/178 |

OTHER PUBLICATIONS

Paul, Polymer Blends, vol. 2, pxii (1978).*

* cited by examiner

*Primary Examiner*—Jeffrey Mullis
(74) *Attorney, Agent, or Firm*—Millen, White, Zelano & Branigan (57) ABSTRACT

The invention relates to a polyamide-based thermoplastic composition comprising, by weight:

50 to 98 parts of a polyamide (A1) nondiamine;

0.2 to 40 parts, preferably 0.2 to 9 parts, of a polyamide (A2) diamine, said polyamide (A2) being different from the polyamide (A1) and the ratio by mass (A2)/(A1) being less than 1;

1 to 60 parts, preferably 1 to 30 parts, of a reactive impact modifier (B) or of a blend of modifiers comprising at least one reactive impact modifier (B) or of a blend (B') comprising at least one impact modifier and at least one reactive modifier.

It also relates to an impact modifier composition and to the process for the preparation of a thermoplastic composition according to the invention using such an impact modifier composition.

23 Claims, 2 Drawing Sheets

POLYAMIDE THERMOPLASTIC COMPOSITIONS WITH IMPROVED IMPACT STRENGTH PROPERTIES

The present invention relates to thermoplastic polyamide compositions with improved impact strength properties and to compositions comprising impact modifiers.

Thermoplastic polyamides, such as PA 6 or PA 6-6, have excellent properties of dimensional stability, of heat resistance or of chemical resistance and which are used in the electrical, electronic or motor vehicle fields. However, the impact strength is not always sufficient, in particular at low temperature.

The improvement in the impact strengths of polyamides is generally obtained by incorporation, in the form of a dispersed phase, of an impact modifier which exhibits an elastomeric nature and reactive functional groups (acrylic acid, maleic anhydride, and the like) capable of reacting with functional groups of the polyamide matrix.

The present invention provides thermoplastic polyamides to which a composition comprising impact modifiers has been added in order to obtain improved impact properties, in particular low-temperature impact strength. The present invention also relates to this composition comprising impact modifiers, which composition is added to polyamides in order to improve the impact properties thereof.

U.S. Pat. No. 5,070,145 discloses compositions composed of 80 parts of polyamide 6 or polyamide 6-6 in which 20 parts of a mixture (i) of a copolymer of ethylene and of an ethyl or butyl acrylate and (ii) of a copolymer of ethylene, of ethyl acrylate and of maleic anhydride have been dispersed. These compositions exhibit good impact strength.

EP 284 379 discloses multiphase compositions comprising polyamide and ethylene copolymer which are provided in the form of a polyamide matrix in which are dispersed nodules (1) of a copolymer of ethylene, of ethyl acrylate and of maleic anhydride, nodules of polyamides are dispersed in these nodules (1). The starting point is the preparation of these nodules (1) by dispersing polyamide in the ethylene copolymer and then crosslinking is carried out, subsequently, these nodules are dispersed in polyamide. These compositions are also presented as having good impact strength.

Patent FR 2 719 849 discloses thermoplastic compositions composed of a matrix of a thermoplastic polymer in which are dispersed nodules of a second thermoplastic polymer partially or completely encapsulated by an ethylene copolymer. These compositions are prepared by first encapsulating the second polymer, the other polymer, which forms the matrix, is subsequently added under conditions such that the capsules are not destroyed. This preparation is carried out in two completely separate stages or one following the other in the same extruder. These compositions exhibit both good flexibility and good impact strength. The examples show matrices comprising polyamide 6, polyamide 12 or PBT (poly(butylene terephthalate)) in which are dispersed nodules of polyamide 6-6 encapsulated by a copolymer of ethylene, of ethyl acrylate and of glycidyl methacrylate.

EP 2 761 discloses polyamides strengthened by polyethylenes or ethylene copolymers grafted with (meth)acrylic acid, its derivatives or maleic anhydride and optionally polyethylene.

EP 52 796 discloses polyamides strengthened by (i) an α-olefin/unsaturated carboxylic acid copolymer, (ii) an α-olefin alkyl ester of unsaturated carboxylic acid copolymer and (iii) a metal compound.

FR 2 292 016 discloses polyamides strengthened by a blend of copolymers of α-olefins and of unsaturated carboxylic acid esters or their derivatives.

U.S. Pat. No. 4,174,358 discloses strengthened polyamides which are provided in the form of a polyamide matrix in which are dispersed nodules of less than 1 μm which have a certain modulus which also has to be a fraction of the modulus of the polyamide. A great many strengtheners are disclosed, some having epoxide functional groups. The majority are polymers having neutralized acid or anhydride functional groups or are blends based on EPDM.

EP 96 264 discloses polyamides with a viscosity of between 2.5 and 5 strengthened by ethylene/$C_2$ to $C_8$ alkyl (meth)acrylate/unsaturated acid or anhydride copolymers comprising 20 to 40% by weight of acrylate.

EP 564 338 discloses polyamides strengthened (i) by ethylene/alkyl (meth)acrylate/glycidyl methacrylate copolymers and (ii) optionally by polyethylenes, ethylene/alkyl (meth)acrylate copolymers or ethylene/alkyl (meth)acrylate/unsaturated dicarboxylic acid anhydride copolymers.

The profuseness of the prior art shows that the problem of the impact strength of polyamides is not simple. The document of the prior art EP 96 264 results in impact strengths at room temperature which are very good but insufficient under cold conditions. By adding another copolymer with glycidyl (meth)acrylate functional groups, as is disclosed in EP 564 338, to these compositions, the impact under cold conditions is improved. However, it is not always convenient to strike a balance between the proportion of the two copolymers in order to obtain a reaction between the unsaturated dicarboxylic acid anhydride and glycidyl methacrylate functional groups.

It has now been found that it is possible to more effectively improve the impact strength of polyamide (A1) nondiamines by adding thereto a smaller amount of an impact modifier and a polyamide (A2) diamine which is preferably immiscible with (A1) and which preferably has a lower melting temperature than that of the polyamide (A1). For example, if (A1) is PA 6, (A2) is PA 12.

A subject matter of the invention is a polyamide-based thermoplastic composition comprising, by weight:
  50 to 98 parts of a polyamide (A1) nondiamine;
  0.2 to 40 parts, preferably 0.2 to 9 parts, of a polyamide (A2) diamine, the chain of said polyamide (A2) being different from that of the polyamide (A1) and the ratio by mass (A2)/(A1) being less than 1;
  1 to 60 parts, preferably 1 to 30 parts, of at least one reactive impact modifier (B) or of a blend (B') comprising at least one impact modifier and at least one reactive modifier.

According to an embodiment of the composition, the latter is characterized in that the reactive impact modifier (B) or the reactive modifier of the blend (B') comprises at least one macromolecule comprising at least two reactive functional groups per macromolecule.

According to an embodiment of the composition, the latter is characterized in that the polyamide (A2) diamine is immiscible with the polyamide (A1) nondiamine.

According to an embodiment of the composition, the melting temperature or the glass transition temperature (Tg), if it is amorphous, of the polyamide (A2) diamine is less than the melting temperature or than the glass transition temperature (Tg), if it is amorphous, of the polyamide (A1) nondiamine.

According to an embodiment of the composition, the difference between the melting temperatures of (A1) and (A2) or between the melting temperature of one and the Tg of the other or between the Tg values of (A1) and (A2), according to the individual case, is between 15 and 50° C., the melting temperatures and the Tg values being measured by DSC (Differential Scanning Calorimetry).

According to an embodiment of the composition, the latter is characterized in that the impact value at +23° C. and/or at −40° C., measured according to the ISO CN standard 179:93, of said composition comprising x parts of (A1), y parts of (A2) and z parts of reactive impact modifier (B) or of blend of modifiers comprising at least one reactive impact modifier (B) or of blend (B') comprising at least one impact modifier and at least one reactive modifier is greater by at least 25%, preferably by at least 50%, than the impact value at +23° C. and/or at −40° C. respectively of a thermoplastic composition not comprising polyamide (A2) diamine but comprising x parts of the same polyamide (A1) nondiamine compound and (z+y) parts of the same reactive impact modifier compound (B) or of the same blend of modifiers comprising at least one reactive impact modifier (B) or of the same blend (B') comprising at least one impact modifier and at least one reactive modifier.

According to an embodiment of the composition, the latter is characterized in that the MFI value of said thermoplastic composition comprising x parts of (A1), y parts of (A2) and z parts of reactive impact modifier (B) or of blend of modifiers comprising at least one reactive impact modifier (B) or of blend (B') comprising at least one impact modifier and at least one reactive modifier is less than the MFI value of a thermoplastic composition not comprising polyamide (A2) diamine but comprising x parts of the same polyamide (A1) nondiamine compound and (z+y) parts of the same reactive impact modifier compound (B) or of the same blend of modifiers comprising at least one reactive impact modifier (B) or of the same blend (B') comprising at least one impact modifier and at least one reactive modifier.

According to an embodiment of the composition, the latter is characterized in that the ratio by mass (A2)/(B) is less than 0.5.

According to an embodiment of the composition, the latter is characterized in that the ratio of the concentrations of the $NH_2$ functional groups of the polyamide (A2) diamine to the reactive functional groups of the reactive impact modifier (B) or of the reactive modifier of the blend (B') is less than 0.5.

According to an embodiment of the composition, the polyamide (A2) diamine is a PA 12 diamine or a polyamide comprising lauryllactam units and/or dodecamethylenediamine units and/or dodecanedioic acid units.

According to an embodiment of the composition, the reactive and/or impact modifier (B) is flexible and has a flexural modulus preferably of less than 200 MPa.

According to an embodiment of the composition, the reactive impact modifier (B) or the reactive modifier of the blend (B') is a copolymer (B1) based on ethylene and on an unsaturated carboxylic acid anhydride, which are copolymerized.

According to an embodiment of the composition, the copolymer (B1) is chosen from ethylene/maleic anhydride and ethylene/alkyl (meth)acrylate/maleic anhydride copolymers, these copolymers comprising from 0.2 to 10% by weight of maleic anhydride and from 0 to 40% by weight of alkyl (meth)acrylate and having an MFI, melt flow index, of between 0.5 and 200 g/10 min (measured at 190° C. under a load of 2.16 kg).

According to an embodiment of the composition, the reactive impact modifier (B) or the reactive modifier of the blend (B') is a copolymer (B1) of ethylene and of a cografted unsaturated carboxylic acid anhydride.

According to an embodiment of the composition, the copolymer (B1) is EPR (ethylene-propylene rubber) cografted with maleic anhydride, said copolymer (B1) preferably representing between 12 and 30 parts by weight of said thermoplastic composition.

According to an embodiment of the composition, the latter comprises between 0.2 and 6 parts by weight of polyamide (A2) diamine.

According to an embodiment of the composition, the reactive impact modifier (B) or the reactive modifier of the blend (B') is a copolymer (B2) based on ethylene and on a cografted or copolymerized unsaturated epoxide.

According to an embodiment of the composition, (B2) is chosen from ethylene/alkyl (meth)acrylate/unsaturated epoxide copolymers and ethylene/unsaturated epoxide copolymers, these copolymers comprising from 0 to 40 parts by weight of alkyl (meth)acrylate and from 0.1 to 10 parts by weight of unsaturated epoxide.

According to an embodiment of the composition:
(A1) is PA 6 nondiamine or PA 6-6 nondiamine;
(A2) is PA 12 diamine or PA 11 diamine;
(B) is the copolymer (B1) described above.

According to an embodiment of the composition:
(A1) is PA 11 nondiamine;
(A2) is PA 12 diamine;
(B) is the copolymer (B1) described above.

According to an embodiment of the composition:
(A1) is PA 12 nondiamine;
(A2) is PA 11 diamine;
(B) is the copolymer (B1) described above.

Another subject matter of the invention is an impact modifier comprising, by weight:
  0.2 to 5 parts, preferably 1 to 3 parts, of a polyamide (A2) diamine;
  5 to 40 parts, preferably 10 to 30 parts, of a reactive impact modifier (B) or of a blend of modifiers comprising at least one reactive impact modifier (B) or of a blend (B') comprising at least one impact modifier and at least one reactive modifier;
  0 to 20 parts of a plasticizer.

Another subject matter of the invention is a process for the preparation of a polyamide-based thermoplastic composition, characterized that it comprises a stage of blending a polyamide (A1) nondiamine with a composition comprising impact modifier as described above.

Figure 1:
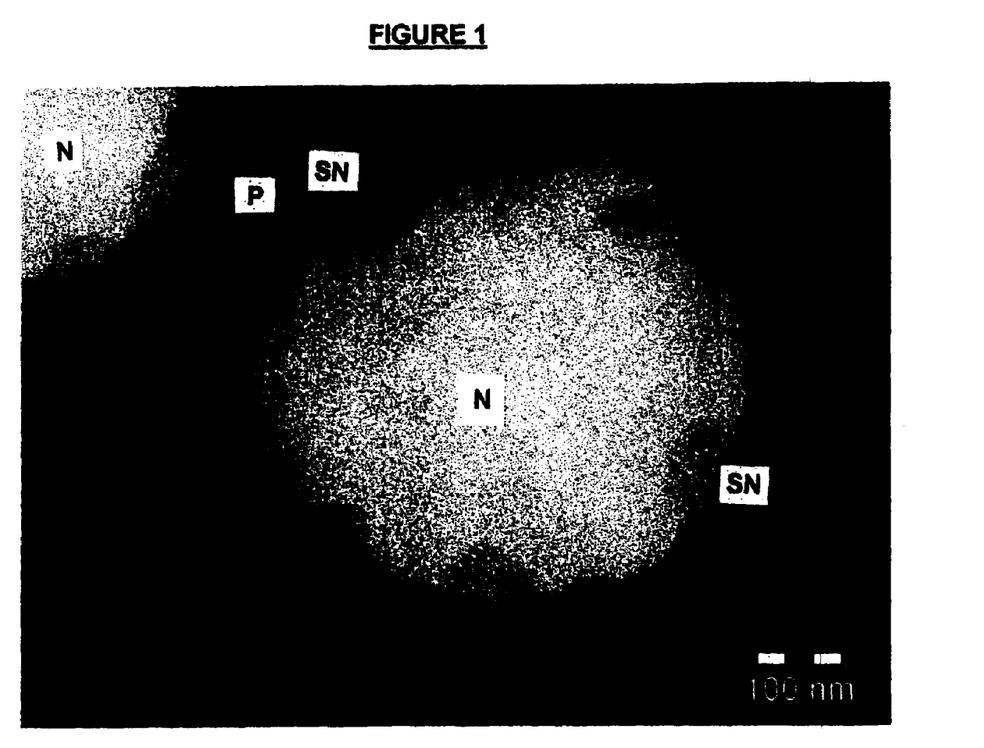
FIG. 1 is a photograph, taken with a transmission electron microscope, of a nodule (N) of a composition comprising PA 6 (78%), Lotader 4700 (20%) and $PA12diNH_2$ (2%), the $PA12diNH$ appearing in the form of a subnodule (SN) on the main nodule (N). The subnodules (SN) can form a bridge (P) between main nodules.
Figure 2:
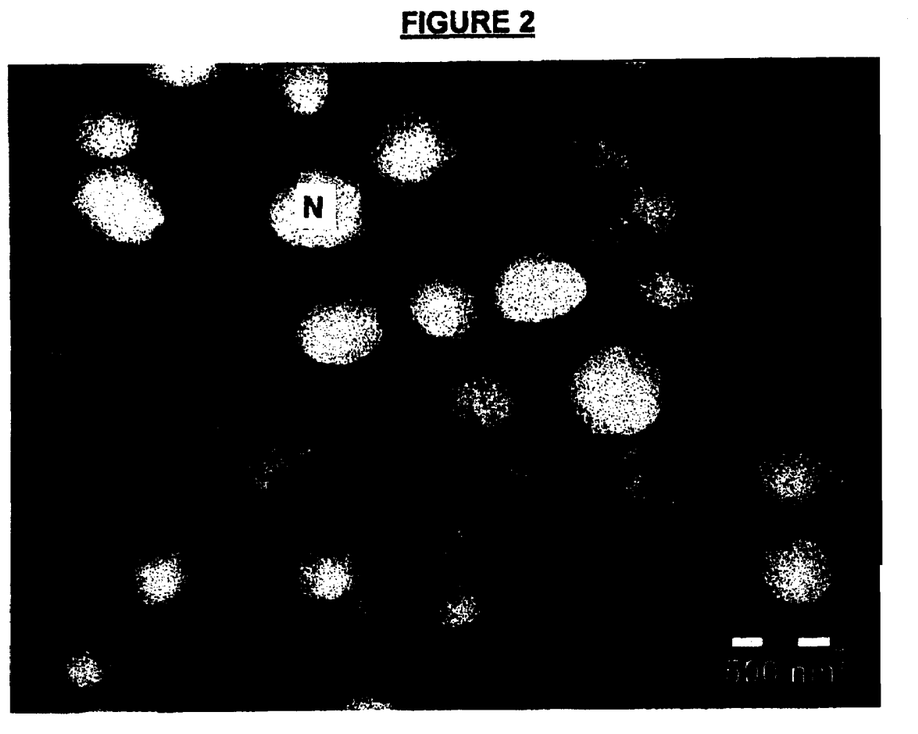
FIG. 2 is a photograph, taken with a transmission electron microscope, of nodules in a composition comprising PA6 (78%), Lotader 4700 (20%) and $PA12diNH_2$ (2%).
Figure 3:
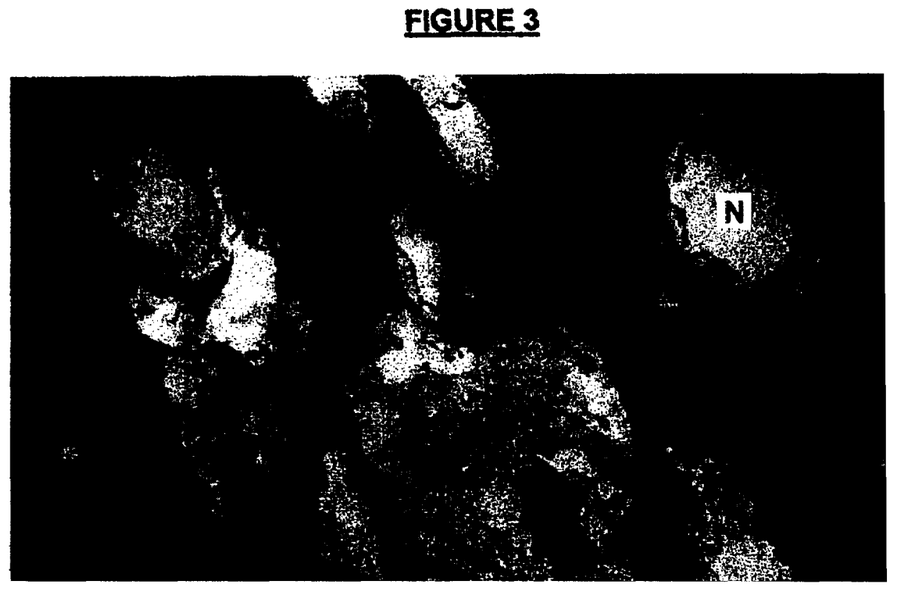
FIG. 3 is a photograph, taken with a transmission electron microscope, of nodules in a composition comprising PA6 (70%), Lotader 4700 (20%) and $PA12diNH_2$ (10%). It is observed that the nodules in FIG. 3 have lost their spherical shape in comparison with FIG. 2 and have crosslinked to one another.

The compositions of the invention are manufactured by melt-blending the various constituents (twin-screw, Buss or single-screw extruders) according to the usual techniques for thermoplastics. The compositions can be granulated for the purpose of subsequent use (it is sufficient to remelt them) or else immediately injected into a mold or an extrusion or coextrusion device for manufacturing items such as pipes or profiles.

DETAILED DESCRIPTION OF THE INVENTION

As regards the polyamide (A1), the term "polyamide" is understood to mean the condensation products:
- of one or more amino acids, such aminocaproic, 7-aminoheptanoic, 11-aminoundecanoic and 12-aminododecanoic acids;
- of one or more lactams, such as caprolactam, enantholactam and lauryllactam;
- of one or more salts or mixtures of diamines, such as tetramethylenediamine, hexamethylenediamine, dodecamethylenediamine meta-xylyenediamine, bis-(p-aminocyclohexyl)methane and trimethylhexamethylenediamine, with diacids, such as isophthalic (I), terephthalic (T), adipic, azelaic, suberic, sebacic and dodecanedicarboxylic acids.

Mention may be made, as example of polyamide, of PA 6 and PA 6-6 and the copolyamides resulting from the condensation of at least two α, ω-aminocarboxylic acids or of two lactams or of one lactam and of one α, ω-aminocarboxylic acid. Mention may also be made of the copolyamides resulting from the condensation of at least one α,ω-aminocarboxylic acid (or one lactam), at least one diamine and at least one dicarboxylic acid. Mention may be made, as example of α,ω-aminocarboxylic acid, of aminoundecanoic acid and aminododecanoic acid.

Mention may be made, as examples of copolyamides, of copolymers of caprolactam and of lauryllactam (PA 6/12), copolymers of caprolactam, of adipic acid and of hexamethylenediamine (PA 6/6-6), copolymers of caprolactam, of lauryllactam, of adipic acid and of hexamethylenediamine (PA 6/12/6-6), copolymers of caprolactam, of lauryllactam, of 11-aminoundecanoic acid, of azelaic acid and of hexamethylenediamine (PA 6/6-9/11/12), copolymers of caprolactam, of lauryllactam, of 11-aminoundecanoic acid, of adipic acid and of hexamethylenediamine (PA 6/6-6/11/12) or copolymers of lauryllactam, of azelaic acid and of hexamethylenediamine (PA 6-9/12).

Mention may be made, as example of lactams, of those which have from 3 to 12 carbon atoms on the main ring and which can be substituted. Mention may be made, for example, of β,β-dimethylpropriolactam, α,α-dimethylpropriolactam, amylolactam, caprolactam, capryllactam and lauryllactam.

Mention may be made, as example of diamine, of aliphatic, having from 6 to 12 atoms, arylic and/or saturated cyclic diamines. Mention may be made, by way of examples, of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, polyoldiamines, isophoronediamine (IPD), methylpentamethylenediamine (MPDM), bis(aminocyclohexyl)-methane (BACM) or bis(3-methyl-4-aminocyclohexyl)methane (BMACM).

Mention may be made, as example of dicarboxylic acid, of adipic acid, sebacic acid, isophthalic acid, butanedioic acid, 1,4-cyclohexyldicarboxylic acid, terephthalic acid, the sodium or lithium salt of sulfoisophthalic acid, dimerized fatty acids (these dimerized fatty acids have a dimer content of at least 98% and are preferably hydrogenated) and dodecanedioic acid HOOC—$(CH_2)_{10}$—COOH.

Use may also be made of any amorphous polyamide, thus without a melting point.

The MFI of the polyamides of the present invention is measured according to the rules of the art at an indicated temperature above the melting temperature of the polyamide. As regards PA 6, the MFI is measured at 235 C under 2.16 kg. As regards PA 6-6, the MFI is measured at 275 C under 2.16 kg.

Use may be made of blends of polyamides. The MFI of the polyamides is advantageously between 0.3 and 100 g/10 min, preferably between 1 and 50 g/10 min.

It would not be departing from the scope of the invention to replace a portion of the polyamide (A1) with a copolymer comprising polyamide blocks and polyether blocks, that is to say to use a blend comprising at least one of the above polyamides and at least one copolymer comprising polyamide blocks and polyether blocks. The copolymers comprising polyamide blocks and polyether blocks result from the copolycondensation of polyamide sequences comprising reactive ends, such as:
- polyamide sequences comprising diamine chain ends with polyoxyalkylene sequences comprising dicarboxyl chain ends;
- polyamide sequences comprising dicarboxyl chain ends with polyoxyalkylene sequences comprising diamine chain ends obtained by cyanoethylation and hydrogenation of aliphatic α,ω-dihydroxylated polyoxyalkylene sequences, known as polyetherdiols;
- polyamide sequences comprising dicarboxyl chain ends with polyetherdiols, the products obtained being, in this specific case, polyetheresteramides. Use is advantageously made of these copolymers, the polyamide sequences comprising dicarboxyl chain ends originating, for example, from the condensation of α,ω-aminocarboxylic acids, of lactams or of dicarboxylic acids and diamines in the presence of a chain-limiting dicarboxylic acid.

With polyether sequences comprising reactive ends, such as the polyether, which can be, for example, a polyethylene glycol (PEG), a polypropylene glycol (PPG) or a polytetramethylene glycol (PTMG), also known as polytetrahydrofuran (PTHF).

The number-average molar mass $\overline{M_n}$ of the polyamide sequences is between 300 and 15 000 and preferably between 600 and 5 000.

The mass $\overline{M_n}$ of the polyether sequences is between 100 and 6 000 and preferably between 200 and 3 000.

The polymers comprising polyamide blocks and polyether blocks can also comprise randomly distributed units. These polymers can be prepared by the simultaneous reaction of the polyether and of the precursors of the polyamide blocks. For example, polyetherdiol, a lactam (or an α,ω-amino acid) and a chain-limiting diacid can be reacted in the presence of a small amount of water. A polymer is obtained which has essentially polyether blocks and polyamide blocks, the latter being of highly variable length, but also the various reactants which have reacted randomly, which are distributed statistically along the polymer chain.

These polymers comprising polyamide blocks and polyether blocks, whether they originate from the copolycondensation of polyamide and polyether sequences prepared beforehand or from a one-stage reaction, exhibit, for example, have Shore D hardnesses which can be between 20 and 75 and advantageously between 30 and 70 and an intrinsic viscosity between 0.8 and 2.5, measured in metacresol at 250° C. for an initial concentration of 0.8 g/100 ml. The MFI values can be between 5 and 50 (at 235° C. under a load of 1 kg).

The polyetherdiol blocks are either used as is and copolycondensed with polyamide blocks comprising carboxyl ends or are aminated, in order to be converted into polyetherdiamines, and condensed with polyamide blocks comprising carboxyl ends. They can be also be blended with polyamide precursors and a chain-limiting agent in order to prepare polymers comprising polyamide blocks and polyether blocks having statistically distributed units.

Polymers comprising polyamide and polyether blocks are disclosed in U.S. Pat. Nos. 4,331,786, 4,115,475, 4,195,015, 4,839,441, 4,230,838 and 4,332,920.

The ratio of the amount of copolymer comprising polyamide blocks and polyether blocks to the amount of polyamide is advantageously between 10/90 and 60/40, by weight. Mention may be made, for example, of blends of (i) PA 6 and (ii) copolymer comprising PA 6 blocks and PTMG blocks, and blends of (i) PA 6 and (ii) copolymer comprising PA 12 blocks and PTMG blocks.

The polyamides, depending on their manufacturing process and/or the chain-limiting agent used, can have excesses of acid or amine endings or can even have a share of alkyl or other endings, for example aryl or any other functional group, resulting from the structure of the limiting agent chosen. The excess of acid endings originates from a diacid chain-limiting agent and the excess of amine endings originates from a diamine chain-limiting agent. A primary amine chain-limiting agent results in a polyamide chain having an alkyl end and an amine end.

The term polyamide diamine or $PAdiNH_2$ is used to denote a polyamide which corresponds to the following three criteria:
  a $PAdiNH_2$ has a certain amount of chains terminated at both ends by an amine group ($NH_2$) which is greater than that of the diacid chains, if there are any; and
  the concentration of amine groups of a $PAdiNH_2$ is greater overall than the concentration of acid groups; and
  a $PAdiNH_2$ is obtained by adding a diamine as chain-limiting agent or, in the case of diamine- and diacid-based polyamides, such as, for example, PA 6-6, by adding more diamine comonomer than diacid comonomer.

Conversely, a polyamide is referred to as polyamide diacide or PAdiCOOH for the opposite reasons.

A polyamide is said to be balanced if:
  chain-limiting agent or excess of one of the comonomers has not been added;
  the concentration of amine groups and of acid groups is essentially equivalent.

A polyamide is said to be monoamine if the chain-limiting agent chosen is a monoamine, resulting in the creation of unreactive alkyl or aryl chain ends.

A polyamide is said to be monoacid if the limiting agent chosen is a monoacid, resulting in the creation of unreactive alkyl or aryl chain ends.

The balanced polyamide monoacids or monoamines defined above will be described as neutral.

In order to determine the nature of the ends of a polyamide and the percentage of chains having these endings, use may be made of the known methods for determining molar masses, such as, for example, SEC (Steric Exclusion Chromatography), and the methods for quantitatively determining amine and acid functional groups.

In the present application, the term SEC denotes the measurement of the molecular masses of polymers by steric exclusion chromatography. This technique and more particularly its application to polyamides and to polyamide-block-polyethers are described in "Journal of Liquid Chromatography, 11(16), 3305–3319 (1988)".

For the determination of the endings, for example for PA 6, the sample is dissolved in a solution of phenol in methanol and the amines are titrated using a solution of para-toluenesulfonic acid in methanol. For the acid ends, still for PA 6, the sample is dissolved in benzyl alcohol and the acid functional groups are titrated using a solution of potassium hydroxide in benzyl alcohol.

It would not be departing from the scope of the invention if (A1) were a mixture of polyamides. (A1) can also be a mixture of miscible polyamides as a result of transamidation reactions, such as, for example, the reaction between an aliphatic polyamide and a semiaromatic polyamide.

Advantageously, (A1) is not a $PAdiNH_2$ and is preferably a "neutral" polyamide (defined above), advantageously PA 6.

As regards the polyamide (A2), it can be chosen from the polyamides mentioned for (A1), but it is diamine and advantageously with a strongly marked $diNH_2$ nature. The polyamide (A2) is different from the polyamide (A1), that is to say that they do not derive from the same monomers. For example, (A1) is a PA 6 and (A2) a PA 12 $diNH_2$ and thus the difference between the PA polymers, in the sense intended here, does not relate to the type of endings but indeed to the nature of the polyamide chain. (A1) and (A2) are preferred immiscible. It would not be departing from the scope of the invention if (A1) and (A2) were to undergo transamidation reactions between one another and thus were to tend to become miscible subsequently. These transamidation reactions generally take place above 300° C.

Mention may be made, as example of such reactions, of the reaction of an aliphatic polyamide with a semiaromatic polyamide. For example, (A1) is PA 12 and (A2) is chosen from BMACM-12, 12/BMACM-I, PACM-12 and 12/BMACM-I/BMACM-T.

According to a first preferred form of the invention, (A2) is immiscible with (A1). (A2) is supposed to be immiscible with (A1) if their blend results has a discrete dispersion of one in the other, typical of the existence of nodules (preferably with a diameter>0.01 μm) of one in the other. Mention may be made, as example, of PA 6 and PA 12, PA 6 and coPA 6/6-6, PA 6 and coPA 6/12, PA 6 and coPA 6/6-6/12, or PA 6 and coPA 6-6/6-10/12.

According to a second preferred form of the invention, the melting temperature or the glass transition temperature (Tg), if it is amorphous, of the polyamide (A2) is less than the melting temperature or than the glass transition temperature (Tg), if it is amorphous, of the polyamide (A1).

Advantageously, a difference of 5 to 80° C. between the melting temperatures or between the melting temperature and the Tg or between the Tg values, according to the individual case, is sufficient. Preferably, this difference is from 15 to 50° C. The melting temperature and the Tg is preferably measured by DSC (Differential Scanning Calorimetry).

It is advantageous to use copolyamides in order to obtain a melting temperature which is lower than that of (A1).

Advantageously, (A2) is a PA 12 or a polyamide comprising lauryllactam units and/or dodecamethylenediamine units and/or dodecanedioic acid units, provided, of course, that the other conditions are observed. It would not be departing from the scope of the invention if (A2) were a mixture of polyamides.

As regards the plasticizer, mention may be made, by way of example, of butylbenzenesulfonamide (BBSA), ethylhexyl para-hydroxybenzoate (EHPB) and decylhexyl para-hydroxybenzoate (DHPB). It would not be departing from the scope of the invention to use a mixture of several plasticizers.

The term "reactive impact modifier" is used to describe any flexible polymer capable of reacting with the polyamide (A2) diamine. Mention may be made, as reactive impact modifier, of functionalized polyolefins, grafted aliphatic polyesters, polymers comprising grafted polyether blocks and polyamide blocks, or functionalized copolymers of core-shell type.

A functionalized polyolefin is a polymer comprising α-olefin units and epoxide or carboxylic acid or carboxylic acid anhydride units.

The term "polyolefin" is understood to mean a polymer comprising olefin units, such as, for example, ethylene, propylene, 1-butene or any other α-olefin units. Mention may be made, by way of example, of:
  polyethylenes, such as LDPE, LLDPE or VLDPE, ethylene/propylene copolymers, or metallocene PEs;
  copolymers of ethylene with at least one product chosen from unsaturated carboxylic acid salts or esters or saturated carboxylic acid vinyl esters.

Mention may also be made of SBS, SIS or SEBS block polymers grafted with unsaturated epoxides, such as glycidyl (meth)acrylate, or with carboxylic acids, such as (meth)acrylic acid, or with unsaturated carboxylic acid anhydrides, such as maleic anhydride.

Mention may be made, as grafted aliphatic polyesters, of polycaprolactone grafted with maleic anhydride, glycidyl methacrylate, vinyl esters or styrene. These products are disclosed in Application EP 711 791, the content of which is incorporated in the present application.

Copolymers of core-shell type denote fine particles having an elastomer core and at least one thermoplastic shell. The size of the particles is generally less than one μm and advantageously between 200 et 500 nm.

Mention may be made, as example of core, of homopolymers of isoprene or of butadiene, copolymers of isoprene with at most 30 mol % of a vinyl monomer and copolymers of butadiene with at most 30 mol % of a vinyl monomer. The vinyl monomer can be styrene, an alkylstyrene, acrylonitrile or an alkyl (meth)acrylate. Another core family is composed of homopolymers of an alkyl (meth)acrylate and copolymers of an alkyl (meth)acrylate with at most 30 mol % of a vinyl monomer. The alkyl (meth)acrylate is advantageously butyl acrylate. The vinyl monomer can be styrene, alkylstyrene, acrylonitrile, butadiene or isoprene. The core can be crosslinked in all or part. It is sufficient to add at least difunctional monomers during the preparation of the core. The shell or shells are homopolymers of styrene, of an alkylstyrene or of methyl methacrylate or copolymers comprising at least 70 mol % of one of these above monomers and at least one comonomer chosen from the other above monomers, vinyl acetate and acrylonitrile.

The shell is functionalized by introducing therein, by grafting or as comonomer during the polymerization, unsaturated functional monomers, such as unsaturated carboxylic acid anhydrides, unsaturated carboxylic acids and unsaturated epoxides. Mention may be made, as example of functional monomers, of: maleic anhydride, (meth)acrylic acid and glycidyl methacrylate.

The reactive modifier is advantageously flexible and its flexural modulus is preferably less than 200 MPa.

It would not be departing from the scope of the invention to use as reactive impact modifier, according to the invention, a blend of several reactive modifiers or a blend of at least one reactive modifier and of at least one unreactive modifier, provided that at least one of these reactive or unreactive modifiers is also an impact modifier in this blend.

According to a first specific form of the invention, the reactive modifier is chosen from copolymers (B1) of ethylene and of an unsaturated carboxylic acid anhydride. The copolymers (B1) can be obtained:
  (i) by grafting the unsaturated carboxylic acid anhydride to the polyethylene homo- or copolymer, the products are then known as grafted copolymers (B1); or
  (ii) by copolymerization, for example radical copolymerization, of ethylene and of an unsaturated carboxylic acid anhydride, the products are then known as ungrafted copolymers (B1).

As regards the grafted copolymers (B1), the unsaturated carboxylic acid anhydride can be chosen, for example, from maleic, itaconic, citraconic, allylsuccinic, cyclohex-4-ene-1,2-dicarboxylic, 4-methylenecyclohex-4-ene-1,2-dicarboxylic, bicyclo(2,2,1)hept-5-ene-2,3-dicarboxylic and x-methylbicyclo(2,2,1)hept-5-ene-2,2-dicarboxylic anhydrides. Use is advantageously made of maleic anhydride. It would not be departing from the scope of the invention to replace all or part of the anhydride with an unsaturated carboxylic acid, such as, for example, (meth)acrylic acid. The grafting is an operation known per se.

Mention may be made, as example of polyethylenes, of:
low density polyethylene (LDPE)
linear low density polyethylene (LLDPE)
very low density polyethylene (VLDPE)
polyethylene obtained by metallocene catalysis, that is to say the polymers obtained by copolymerization of ethylene and of α-olefin, such as propylene, butene, hexene or octene, in the presence of a single-site catalyst generally composed of a zirconium or titanium atom and of two cyclic alkyl molecules bonded to the metal. More specifically, the metallocene catalysts are usually composed of two cyclopentadiene rings bonded to the metal. These catalysts are frequently used with aluminoxanes as cocatalysts or activators, preferably methylaluminoxane (MAO). Hafnium can also be used as metal to which the cyclopentadiene is attached. Other metallocenes can include transition metals from Groups IVA, VA, and VIA. Metals from the lanthamide series can also be used.
EPR (ethylene/propylene rubber) elastomers
EPDM (ethylene/propylene/diene) elastomers
blends of polyethylene with an EPR or an EPDM
ethylene/alkyl (meth)acrylate copolymers which can comprise up to 60% by weight of (meth)acrylate and preferably between 2 and 40%.

Mention may be made, as comonomers, of:
α-olefins, advantageously those having from 3 to 30 carbon atoms. Mention may be made, as examples of α-olefins, of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-docosene, 1-tetracocene, 1-hexacocene, 1-octacocene and 1-triacontene, it being possible for these α-olefins be used alone or as a mixture of two or of more than two;
unsaturated carboxylic acid esters, such as, for example, alkyl (meth)acrylates, it being possible for the alkyls to have up to 24 carbon atoms: examples of alkyl acrylate or methacrylate are in particular methyl methacrylate, ethyl acrylate, n-butyl acrylate, isobutyl acrylate or 2-ethylhexyl acrylate;

vinyl esters of saturated carboxylic acids, such as, for example, vinyl acetate or propionate;

dienes, such as, for example, 1,4-hexadiene.

The polyethylene can comprise several of the above comonomers.

The polyethylene, which can be a blend of several polymers, advantageously comprises at least 50% and preferably 75% (in moles) of ethylene and its density can be between 0.86 and 0.98 g/cm$^3$. The MFI or melt flow index (at 190° C. under 2.16 kg) is advantageously between 0.1 and 1 000 g/10 min.

As regards the ungrafted copolymers (B1), mention may be made of copolymers or ethylene, of unsaturated carboxylic acid anhydride and optionally of another monomer which can be chosen from the comonomers mentioned above for the grafted copolymers (B1).

Use is advantageously made of ethylene/maleic anhydride copolymers and ethylene/alkyl (meth)acrylate/maleic anhydride copolymers. These copolymers comprise from 0.2 to 10% by weight of maleic anhydride and from 0 to 40%, preferably from 5 to 40%, by weight of alkyl (meth)acrylate. Their MFI is between 0.5 and 200 (at 190° C. under 2.16 kg). The alkyl (meth)acrylates have already been described above. Use may be made of a blend of several ungrafted copolymers (B1). It is also possible to use a blend of an ethylene/maleic anhydride copolymer and of an ethylene/alkyl (meth)acrylate/maleic anhydride copolymer. It would not be departing from the scope of the invention if the anhydride were hydrolyzed in all or part or to replace the anhydride with an unsaturated carboxylic acid. These acid functional groups or those originating from the hydrolysis of the anhydride can be neutralized with a metal, such as zinc or an alkali metal, such as lithium.

The ungrafted copolymer (B1) is commercially available it is produced by radical polymerization at a pressure which can be between 200 and 2 500 bar, it is sold in the form of granules.

According to a second specific form of the invention, the reactive modifier is chosen from copolymers (B2) of ethylene and of an unsaturated epoxide. The copolymers (B2) can be obtained:

(iii) by grafting the unsaturated epoxide to the polyethylene homo- or copolymer, the products are then known as grafted copolymers (B2); or (iv) by copolymerization, for example radical copolymerization, of ethylene and of the unsaturated epoxide, the products are then known as ungrafted copolymers (B2).

The grafting can be carried out in the solvent phase or on the molten polyethylene in the presence of a peroxide. These grafting techniques are known per se. Regarding the copolymerization of ethylene and of an unsaturated epoxide, use may be made of the processes known as radical polymerization processes which usually operate at pressures between 200 and 2 500 bar.

Mention may be made, as example of unsaturated epoxides, of:

aliphatic glycidyl esters and ethers, such as allyl glycidyl ether, vinyl glycidyl ether, glycidyl maleate, glycidyl itaconate or glycidyl (meth)acrylate, and alicyclic glycidyl esters and ethers, such as 2-cyclohex-1-ene glycidyl ether, diglycidyl cyclohexene-4,5-carboxylate, glycidyl cyclohexene-4-carboxylate, glycidyl 2-methyl-5-norbornene-2-carboxylate and diglycidyl endo-cis-bicyclo(2,2,1)hept-5-ene-2,3-dicarboxylate.

As regards the grafting, the copolymer is obtained from the grafting of a polyethylene homo- or copolymer as described for (B1) on which an epoxide is grafted instead of an anhydride. The copolymerization is similar to that described for (B1), except that an epoxide is used. There may also be other comonomers, as in the case of (B1).

The product (B2) is advantageously an ethylene/alkyl (meth)acrylate/unsaturated epoxide copolymer or an ethylene/unsaturated epoxide copolymer. It can advantageously comprise from 0 to 40% by weight of alkyl (meth)acrylate, preferably from 5 to 40%, and from 0.1 to 10% by weight of unsaturated epoxide, preferably 0.1 to 8%.

The epoxide is advantageously glycidyl (meth)acrylate.

The alkyl (meth)acrylate is advantageously chosen from methyl (meth)acrylate, ethyl acrylate, n-butyl acrylate, isobutyl acrylate or 2-ethylhexyl acrylate. The amount of alkyl (meth)acrylate is advantageously from 20 to 35%. The MFI is advantageously between 0.5 and 200 g/10 min (at 190° C. under 2.16 kg). It is possible to use a blend of several copolymers (B2) or a blend of an ethylene/alkyl (meth)acrylate/unsaturated epoxide copolymer and of an ethylene/unsaturated epoxide copolymer. This copolymer (B2) can be obtained by radical polymerization of the monomers.

According to other specific forms of the invention, an unreactive modifier can be used in addition to the above reactive modifier. Mention may be made, as example, of the same polymers as the reactive modifier but not carrying functional groups. Mention may be made, as example, of polyolefins, polyoctenamers (for example, Vestenamer® sold by Degussa Hüls) and core-shells which are not functionalized. The polyolefin is advantageously chosen from LLDPE, VLDPE, ethylene/vinyl acetate copolymers or ethylene/alkyl (meth)acrylate copolymers. The density can advantageously be as low as possible and the melt flow index (MFI) at 190° C. and 2.16 kg can advantageously be between 0.3 and 40.

Advantageous Compositions are Such That:

(A1) is PA 6 or PA 6-6;

(A2) is PA 12 diamine or PA 11 diamine;

the reactive modifier being the copolymer (B1).

The invention is of particular use for PA 6 polymers with MFI values (at 235° C. under 2.16 kg) of 5 to 30 g/10 min. For more viscous PA 6 polymers, for example those having MFI values of less than 5 g/10 min, the improvement relates essentially to the impact at room temperature.

Mention may also be Made of the Compositions:

(A1) is PA 11;

(A2) is PA 12 diamine;

the reactive modifier being the copolymer (B1).

Mention May also be Made of:

(A1) is PA 12;

(A2) is PA 11 diamine;

the reactive modifier being the copolymer (B1).

Advantageous Compositions Comprise, by Weight:

70 to 90 parts, preferably 75 to 85 parts, of polyamide (A1);

0.2 to 5 parts, preferably 1 to 3 parts, of polyamide (A2);

5 to 40 parts, preferably 10 to 30 parts, of reactive modifier;

0 to 20 parts of plasticizer.

Advantageous compositions also comprise the combination of the advantageous forms which have just been described.

The invention also relates to compositions comprising impact modifier comprising, by weight:

0.2 to 5 parts, preferably 1 to 3 parts, of polyamide (A2) diamine;

5 to 40 parts, preferably 10 to 30 parts, of reactive modifier;

0 to 20 parts of plasticizer.

The compositions according to the invention, the modified polyamides or the compositions comprising impact modifier, can additionally include at least one additive chosen from:

dyes;
pigments;
brighteners;
plasticizers;

and in particular the usual additives for PA polymers, namely stabilizers, lubricants, fillers, flame retardants and in particular strengthening fillers, such as glass fibers, carbon fibers or mineral fibers of wollastonite type.

EXAMPLES

The following products were used in examples in the tables which follow:

Lotader® 4700: ethylene/ethyl acrylate/maleic anhydride statistical copolymer with proportions by weight of 68.5/30/1.5, with an MFI value of between 3 and 10 g/10 min (at 190° C. under 2.16 kg), obtained by high pressure radical catalysis. It has on average 2 to 3 anhydride functional groups per macromolecule.

Lotader® 4720: ethylene/ethyl acrylate/maleic anhydride statistical copolymer with proportions by weight of 69.7/30/0.3, with an MFI value of between 3 and 10 g/10 min (at 190° C. under 2.16 kg), obtained by high pressure radical catalysis. It has on average 0.4 to 1.2 anhydride functional groups per macromolecule.

Lotader® 3410: ethylene/butyl acrylate/maleic anhydride statistical copolymer with proportions by weight of 78/18/3, with an MFI value of between 3 and 10 g/10 min (at 190° C. under 2.16 kg), obtained by high pressure radical catalysis. It has on average 3 to more than 3 anhydride functional groups per macromolecule.

Exxelor VA1801®: EPRm, ethylene/propylene copolymer grafted with maleic anhydride, sold by Exxon.

PA 12 $diNH_2$: PA 12 diamine with a melting temperature of 178° C. and with an MFI value of between 20 and 40 g/10 min (at 235° C. under 5 kg).

PA 6 $diNH_2$: PA 6 diamine with a melting temperature of 220° C. and with an MFI value of between 30 and 50 g/10 min (at 235° C. under 2.16 kg).

PA6 Akulon C225®: PA 6 with an MFI value of between 17 and 23 g/10 min (at 235° C. under 2.16 kg), sold by DSM.

PA 6 Ultramid® B3: PA 6 with an MFI value of between 17 and 23 g/10 min (at 235° C. under 2.16 kg).

PA6 Domamid 27®: PA 6 with an MFI value of between 17 and 23 g/10 min (at 235° C. under 2.16 kg), sold by Domo.

PA 12 diCOOH: PA 12 diacide with an MFI value of between 20 and 40 g/10 min (at 235° C. under 5 kg).

coPA 6/6-6/12 $diNH_2$: copolyamide diamine with a composition as % by mass of 55/20/25 respectively, with a melting temperature of between 140 and 160° C. and with an MFI value of between 25 and 35 g/10 min (at 235° C. under 2.16 kg).

coPA IPD.10/12 $diNH_2$: copolyamide diamine comprising PA10/PA12 with a composition by mass of 80/20, with a glass transition temperature Tg=100–120° C. and with an MFI value of between 10 and 30 g/10 min (at 235° C. under 5 kg).

Lotryl 30BA02®: ethylene/butyl acrylate statistical copolymer with proportions by weight of 70/30, with an MFI value of between 1 and 4 (at 190° C. under 2.16 kg), obtained by high pressure radical catalysis.

Engage 8842®: ethylene/octene copolymer, sold by Dupont Dow Elastomer.

Surlyn 9020®: ethylene/methacrylic acid copolymer salified with $Zn^{2+}$, sold by Dupont.

The compositions were prepared on a corotating twin-screw extruder and on a Buss Ko-Kneader. The various ingredients were introduced according to the rules of the art. The compositions were recovered in the form of granules. Bars were subsequently injection molded and were conditioned for 15 days at 50% relative humidity, and then impact measurements were carried out according to the ISO CN standard 179:93 at –40° C. and +23° C. The results are recorded in TABLE 1 below. Comp. A and comp. B constitute the comparative examples. Examples C and D are compositions according to the invention for which the impact strength at +23° C. and at –40° C. and the MFI (melt flow index) value at 235° C. under a load of 2.16 kg have been measured.

TABLE 1

|  | Comp. A | Comp. B | C | D |
|---|---|---|---|---|
| PA 6 Ultramid B3 | 100 | 80 | 78 | 70 |
| Lotader 4700 |  | 20 | 20 | 20 |
| PA 12 $diNH_2$ |  |  | 2 | 10 |
| Impact at +23° C. | 8 | 23 | 84 | 118 |
| Impact at –40° C. | 2.8 | 7.8 | 19 | 17 |
| MFI (235° C.; 2.16 kg) in g/10 min |  | 3.8 | 4.0 | 1.6 |

Examples 22 to 27 in TABLE 2 show the effectiveness as regards impact at low temperature of a composition according to the invention comprising: PA nondiamine/PA $diNH_2$/reactive impact modifier, in comparison with the comparative example 21, this being the situation with low proportions of PA $diNH_2$, whatever the process (preblended or nonpreblended). It is also found that these compositions according to the invention have a high MFI value and are therefore fluid, allowing them to be easily processed with a good productive output.

TABLE 2

|  | Comp. 21 | Ex. 22 | Ex. 23 | Ex. 24 | Ex. 25 | Ex. 26 | Ex. 27 |
|---|---|---|---|---|---|---|---|
| PA6 Domamid 27 | 80 | 78 | 80 | 80 | 80 | 80 | 80 |
| Lotader 4700 | 20 | 20 | 18 | 18 | 18# | 19 | 16 |
| PA12$diNH_2$ |  |  |  | 2 | 2# |  |  |
| PA12$diNH_2$ (other batch) |  | 2 | 2 |  |  | 1 | 4 |

TABLE 2-continued

|  | Comp. 21 | Ex. 22 | Ex. 23 | Ex. 24 | Ex. 25 | Ex. 26 | Ex. 27 |
|---|---|---|---|---|---|---|---|
| MFI (235° C.; 2.16 kg) in g/10 min | 5.9 |  | 7.7 |  |  | 8.2 | 6.2 |
| Impact at +23° C. | 40 | 95 | 88 | 94 | 73 | 77 | 90 |
| Impact at −40° C. | 12.9 | 17.5 | 17.7 | 21.3 | 17.7 | 17.3 | 18.3 | the Lotader 4700 and the PA 12 diNH$_2$ were preextruded preblended, that is to say melt preblended and then introduced into the PA 6.

The comparative examples 31, 34 and 35 and example 32 in TABLE 3 make it possible to demonstrate:

the importance of having a PA(A2)diNH$_2$ in comparison with a PA(A2)diCOOH (see example 32 and comp. 35) on the impact strength at low temperatures;

the importance of having PAdiNH$_2$ in a composition: PA nondiamine/reactive impact modifier (see example 32 and comp. 31), on the impact strength at low temperatures, the importance of having a PA(A2) different from the PA(A1) (see example 32 and comp. 34) on the impact strength at low temperatures. PA(A2) can comprise "6" unit identical to the "6" units of PA(A1), provided that it is composed substantially of other "6.6" or "12" units and that it is immiscible in the predominant matrix PA.

TABLE 3

|  | Comp. 31 | Ex. 32 | Comp. 34 | Comp. 35 |
|---|---|---|---|---|
| PA6 Domamid 27 | 80 | 80 | 80 | 80 |
| Lotader 4700 | 20 | 18 | 18 | 18 |
| coPA6/6.6/12diNH$_2$ |  | 2 |  |  |
| PA6diNH$_2$ |  |  | 2 |  |
| PA12diCOOH |  |  |  | 2 |
| Impact at +23° C. | 59 | 85 | 58 | 42 |
| Impact at −40° C. | 12.2 | 18.2 | 13.7 | 11 |

Table 4 illustrates the effectiveness of PA12diNH$_2$ in terms of resistance to thermal aging. The values measured, combined in table 4, were obtained by acting on dumbbell-shaped test specimens placed in an environment with air at 140° C. These test specimens are subjected to a tensile test and the value of elongation at break is monitored. The index is assigned to the value of elongation at break at t=0 (unaged test specimen). The half-life is defined as being the time at which the elongation at break is only half its initial value, recorded in table 4.

Comparative examples 41 and 42 and example 43 are stabilized by conventional commercially available organic stabilizers. "TL" is a blend of Lowinox 44B25 from Lowi, Tinuvin 312 from Ciba, and Hostanox TM PAR 24 from Hoechst, in proportions by weight of ⅔, ⅙ and ⅙.

Comparative examples 44 and 45 and example 46 are stabilized by inorganic stabilizers. "A6" is a blend of copper iodide and potassium iodide in proportions by weight of 1 to 8.

This table shows an additional advantage of using, as impact modifier, PA12diNH$_2$ in comparison with EPRm as regards resistance to aging.

TABLE 4

|  | Comp. 41 | Comp. 42 | Ex. 43 | Comp. 44 | Comp. 45 | 46 |
|---|---|---|---|---|---|---|
| PA6 Akulon C225 | 78.8 | 78.8 | 78.8 | 79.3 | 79.3 | 79.3 |
| Lotader 4700 |  | 20 | 18 |  | 20 | 18 |
| EPRm VA1801 | 20 |  |  | 20 |  |  |
| PA12 diNH$_2$ |  |  | 2 |  |  | 2 |
| TL | 1.2 | 1.2 | 1.2 |  |  |  |
| A6 |  |  |  | 0.7 | 0.7 | 0.7 |
| Impact at +23° C. |  | 30 | 86 | 73 | 29 | 86 |
| Impact at −40° C. |  | 10.3 | 19 | 13.4 | 9.7 | 19.4 |
| Resistance to aging | <24 | 175 | 250 | <24 | 200 | 400 |

TABLE 5 demonstrates the advantages of the composition according to the invention. These compositions give good impact results from +23° C. to −40° C. with a low percentage of PAdiNH$_2$ but also with very little reactive modifier.

This is because examples 56 and 58 show that, with only 2% of reactive modifier comprising macromolecules comprising at least two reactive functional groups per chain, good impact results are obtained.

In contrast, comp. 62 shows that, with 18% of reactive impact modifier comprising macromolecules comprising less than two reactive functional groups per chain, markedly poorer impact results are obtained.

TABLE 5

| Ex.: | 51 comp. | 52 | 53 | 54 | 55 Comp. | 56 | 57 comp. | 58 | 59 comp. | 60 | 61 comp. | 62 comp. | 63 | 64 | 65 |
|---|---|---|---|---|---|---|---|---|---|---|---|---|---|---|---|
| PA6 | 80 | 80 | 80 | 80 | 80 | 80 | 80 | 80 | 80 | 80 | 80 | 80 | 80 | 80 | 80 |
| Lotader 4700 | 20 | 18 | 18 | 16 |  |  |  |  |  |  |  |  | 19.8 | 19.6 | 19 |
| PA12diNH$_2$ |  | 2 |  | 2 |  | 2 |  | 2 |  | 2 |  | 2 | 0.2 | 0.4 | 1 |
| Lotader 3410 |  |  | 2 | 2 | 2 | 2 | 2 | 2 |  |  |  |  |  |  |  |
| Lotryl 30BA02 |  |  |  |  | 18 | 16 |  |  |  |  |  |  |  |  |  |
| Engage 8842 |  |  |  |  |  |  | 18 | 16 |  |  |  |  |  |  |  |
| CoPA IPD.10/12diNH$_2$ |  |  | 2 |  |  |  |  |  |  |  |  |  |  |  |  |

TABLE 5-continued

| Ex.: | 51 comp. | 52 | 53 | 54 | 55 Comp. | 56 | 57 comp. | 58 | 59 comp. | 60 | 61 comp. | 62 comp. | 63 | 64 | 65 |
|---|---|---|---|---|---|---|---|---|---|---|---|---|---|---|---|
| Lotader 4720 | | | | | | | | | | | 20 | 18 | | | |
| Surlyn 9020 | | | | | | | | | 20 | 18 | | | | | |
| MFI (235° C.; 2.16 kg) in g/10 min | 3.4 | 4.5 | 8.1 | 5.7 | | 9.6 | | | | | | | 6.1 | 6.8 | 7.7 |
| Impact at +23° C. | 26 | 90 | 69 | 85 | 32 | 83 | 76 | 80 | 24 | 28 | 31 | 38 | 36 | 48 | 69 |
| Impact at −40° C. | 8.0 | 17.4 | 15.7 | 16.2 | 11.5 | 14.3 | 9.9 | 13.9 | 10.7 | 14 | 10.6 | 12.7 | 9.8 | 12 | 15.4 |

The invention claimed is:

1. A polyamide-based thermoplastic composition comprising, based on a total of 100 parts by weight of (A1), (A2) and (B) or (B'):

61 to 98 parts of a polyamide (A1) nondiamine;

0.2 to 9 parts of a polyamide (A2) diamine, the chain of said polyamide (A2) being different from that of the polyamide (A1) said polyamide (A2) being immiscible with said polyamide (A1) nondiamine and the ratio by mass (A2)/(A1) being less than 1;

1 to 30 parts of at least one reactive impact modifier (B) or of a blend (B') comprising at least one impact modifier and at least one reactive modifier, in which the melting temperature of the polyamide (A2) diamine or, if it is amorphous, its glass transition temperature (Tg) is less than the melting temperature of the polyamide (A1) nondiamine or, if it is amorphous, less than its glass transition temperature (Tg), in which the difference between the melting temperatures of (A1) and (A2) or between the melting temperature of one and the Tg of the other or between the Tg values of (A1) and (A2), according to the individual case, is between 15 and 50° C., the melting temperatures and the Tg values being measured by DSC (Differential Scanning Calorimetry), and wherein the impact value at +23° C. and/or at −40° C., measured according to the ISO CN standard 179:93, of said composition comprising x parts of (A1), y parts of (A2) and z parts of reactive impact modifier (B) or of blend of modifiers comprising at least one reactive impact modifier (B) or of blend (B') comprising at least one impact modifier and at least one reactive modifier is greater by at least 25% than the impact value at +23° C. and/or at −40° C. respectively of a thermoplastic composition not comprising polyamide (A2) diamine but comprising x parts of the same polyamide (A1) nondiamine compound and (z+y) parts of the same reactive impact modifier compound (B) or of the same blend of modifiers comprising at least one reactive impact modifier (B) or of the same blend (B') comprising at least one impact modifier and at least one reactive modifier.

2. The composition as claimed in 1, wherein the reactive impact modifier (B) or the reactive modifier of the blend (B') comprises at least one macromolecule comprising at least two reactive functional groups per macromolecule.

3. The composition as claimed in 1, wherein the impact value at +23° C. and/or at −40° C., measured according to the ISO CN standard 179:93, of said composition comprising x parts of (A1), y parts of (A2) and z parts of reactive impact modifier (B) or of blend of modifiers comprising at least one reactive impact modifier (B) or of blend (B') comprising at least one impact modifier and at least one reactive modifier is greater by at least 50% than the impact value at +23° C. and/or at −40° C. respectively of a thermoplastic composition not comprising polyamide (A2) diamine but comprising x parts of the same polyamide (A1) nondiamine compound and (z+y) parts of the same reactive impact modifier compound (B) or of the same blend of modifiers comprising at least one reactive impact modifier (B) or of the same blend (B') comprising at least one impact modifier and at least one reactive modifier.

4. The composition as claimed in 1, wherein the MFI value of said thermoplastic composition comprising x parts of (A1), y parts of (A2) and z parts of reactive impact modifier (B) or of blend of modifiers comprising at least one reactive impact modifier (B) or of blend (B') comprising at least one impact modifier and at least one reactive modifier is less than the MFI value of a thermoplastic composition not comprising polyamide (A2) diamine but comprising x parts of the same polyamide (A1) nondiamine compound and (z+y) parts of the same reactive impact modifier compound (B) or of the same blend of modifiers comprising at least one reactive impact modifier (B) or of the same blend (B') comprising at least one impact modifier and at least one reactive modifier.

5. The composition as claimed in 1, wherein the ratio by mass (A2)/(B) is less than 0.5.

6. The composition as claimed in 1, wherein the ratio of the concentrations of the $NH_2$ functional groups of the polyamide (A2) diamine to the reactive functional groups of the reactive impact modifier (B) or of the reactive modifier of the blend (B') is less than 0.5.

7. A polyamide-based thermoplastic composition comprising, based on a total of 100 parts by weight of (A1), (A2) and (B) or (B'):

61 to 98 parts of a polyamide (A1) nondiamine;

0.2 to 9 parts of a polyamide (A2) diamine, the chain of said polyamide (A2)

being different from that of the polyamide (A1) said polyamide (A2) being immiscible with said polyamide (A1) nondiamine and the ratio by mass (A2)/(A1) being less than 1;

1 to 30 parts of at least one reactive impact modifier (B) or of a blend (B') comprising at least one impact modifier and at least one reactive modifier, in which the melting temperature of the polyamide (A2) diamine or, if it is amorphous, its glass transition temperature (Tg) is less than the melting temperature of the polyamide (A1) nondiamine or, if it is amorphous, less than its glass transition temperature (Tg), in which the difference between the melting temperatures of (A1) and (A2) or between the melting temperature of one and the Tg of the other or between the Tg values of (A1) and (A2), according to the individual case, is between 15 and 50° C., the melting temperatures and the Tg values being measured by DSC (Differential Scanning Calorimetry), and wherein the impact value at +23° C. and/or at −40° C., measured according to the ISO CN standard 179:93, of said composition comprising x parts of (A1), y parts of (A2) and z parts of reactive impact modifier (B) or of blend of modifiers comprising at least one reactive impact modifier (B) or of blend (B') comprising at least one impact modifier and at least one reactive modifier is greater by at least 25% than the impact value at +23° C. and/or at −40° C. respectively of a thermoplastic composition not comprising polyamide (A2) diamine but comprising x parts of the same polyamide (A1) nondiamine compound and (z+y) parts of the same reactive impact modifier compound (B) or of the same blend of modifiers comprising at least one reactive impact modifier (B) or of the same blend (B') comprising at least one impact modifier and at least one reactive modifier, in which the polyamide (A2) diamine comprises a PA 12 diamine or a polyamide comprising lauryllactam units and/or dodecamethylenediamine units and/or dodecanedioic acid units.

8. The composition as claimed in 1, in which the reactive and/or impact modifier is flexible and has a flexural modulus of less than 200 MPa.

9. The composition as claimed in 1, in which the reactive impact modifier (B) or the reactive modifier of the blend (B') comprises a copolymer (B1) resulting from the copolymerization of ethylene and an unsaturated carboxylic acid anhydride.

10. The composition as claimed in 9, in which the copolymer (B1) is chosen from ethylene/maleic anhydride and ethylene/alkyl (meth)acrylate/maleic anhydride copolymers, these copolymers comprising from 0.2 to 10% by weight of maleic anhydride and from 0 to 40% by weight of alkyl (meth)acrylate and having an MFI, melt flow index, of between 0.5 and 200 g./10 mm (measured at 190° C. under a load of 2.16 kg).

11. The composition as claimed in 1, in which the reactive impact modifier (B) or the reactive modifier of the blend (B') is a graft copolymer (B1) comprising repeating units of ethylene and a cografted unsaturated carboxylic acid anhydride.

12. The composition as claimed in 11, in which the copolymer B1) is EPR (ethylene-propylene rubber) cografted with maleic anhydride.

13. The composition as claimed in 12, comprising between 0.2 and 6 parts by weight of polyamide (A2) diamine.

14. The composition as claimed in 1, in which the reactive impact modifier (B) or the reactive modifier of the blend (B') is a copolymer (B2) comprising ethylene and a cografted or copolymerized unsaturated epoxide.

15. The composition as claimed in 14, in which (B2) is chosen from ethylene/alkyl (meth)acrylate/unsaturated epoxide copolymers and ethylene/unsaturated epoxide copolymers, these copolymers comprising from 0 to 40 parts by weight of alkyl (meth)acrylate and from 0.1 to 10 parts by weight of unsaturated epoxide.

16. The composition as claimed in 1, wherein:
(A1) is PA 6 nondiamine or PA 6-6 nondiamine;
(A2) is PA 12 diamine or PA 11 diamine;
(B) is the copolymer (B1) comprising ethylene and an unsaturated carboxylic acid anhydride, the latter being optionally cografted.

17. The composition as claimed in 1, wherein:
(A1) is PA 11 nondiamine;
(A2) is PA 12 diamine;
(B) is the copolymer (B1) comprising ethylene and an unsaturated carboxylic acid anhydride, the latter being optionally cografted.

18. The composition as claimed in 1, wherein:
(A1) is PA 12 nondiamine;
(A2) is PA 11 diamine;
(B) is the copolymer (B1) comprising ethylene and an unsaturated carboxylic acid anhydride, the latter being optionally cografted.

19. A process for the preparation of the polyamide-based thermoplastic composition as claimed in 1, comprising blending a polyamide (A1) nondiamine with an impact modifier composition comprising, by weight:
0.2 to 5 parts of a polyamide (A2) diamine;
5 to 40 parts of at least one reactive impact modifier (B) or of a blend (B') comprising at least one impact modifier and at least one reactive modifier;
0 to 20 parts of a plasticizer.

20. A composition according to claim 12, wherein (B1) constitutes between 12 and 30 parts by weight of said thermoplastic compositions.

21. A composition according to claim 13, wherein (B1) constitutes between 12 and 30 parts by weight of said thermoplastic compositions.

22. A process according to 19, said impact modifier comprising by weight 1–3 parts of said polyamide (A2) diamine and 10–30 parts by weight of said at least one reactive impact modifier.

23. A composition according to 1, wherein (A1) is PA6 non-diamine and (A2) is coPA6/6,6/12 diNH$_2$.

* * * * *